3,045,176
METHOD AND APPARATUS FOR MEASURING THE THICKNESS OF DIELECTRIC COATINGS
Robert Voltmann, Pontiac, Mich., assignor to Chrysler Corporation, Highland Park, Mich., a corporation of Delaware
Filed June 6, 1957, Ser. No. 663,933
20 Claims. (Cl. 324—54)

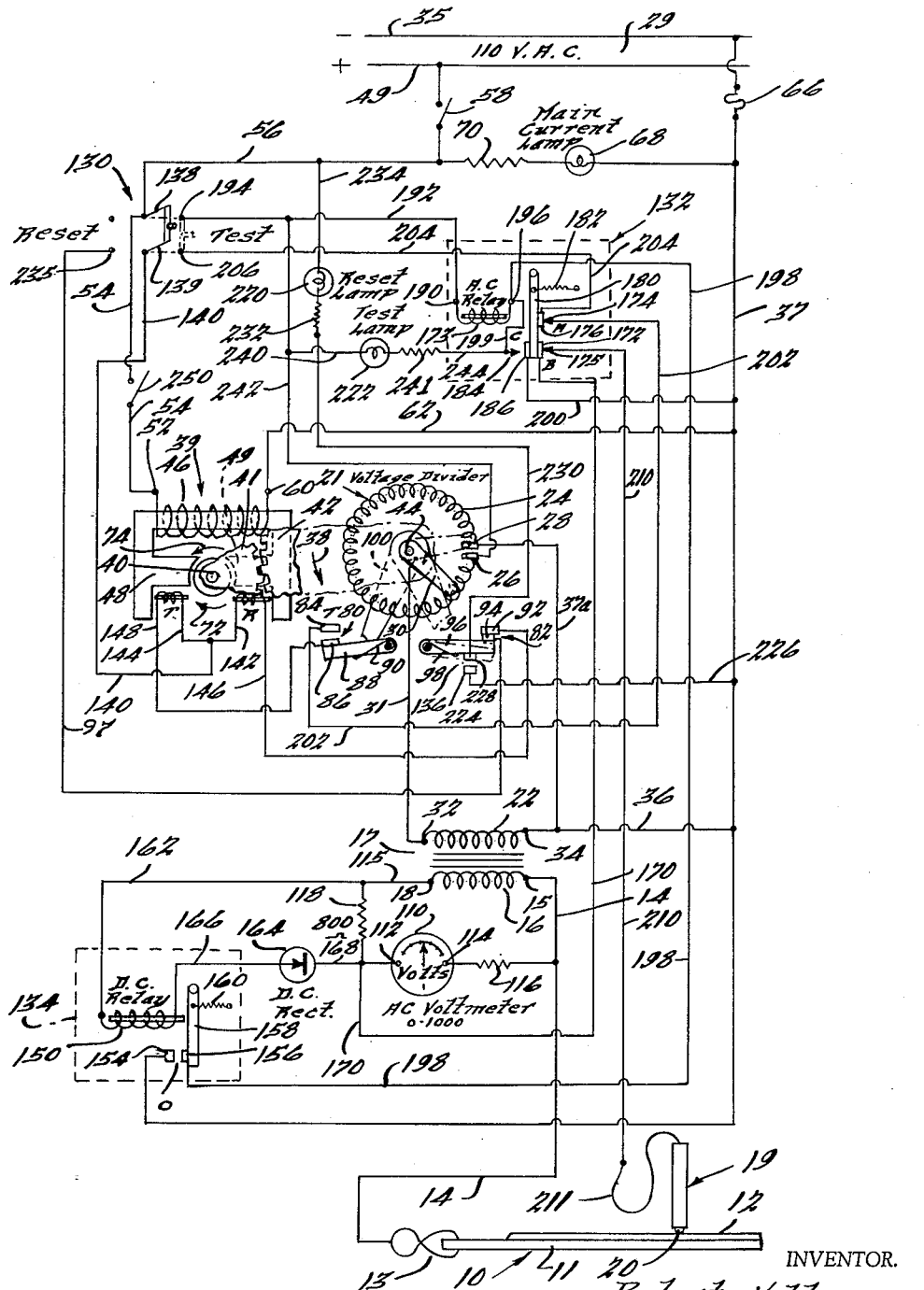

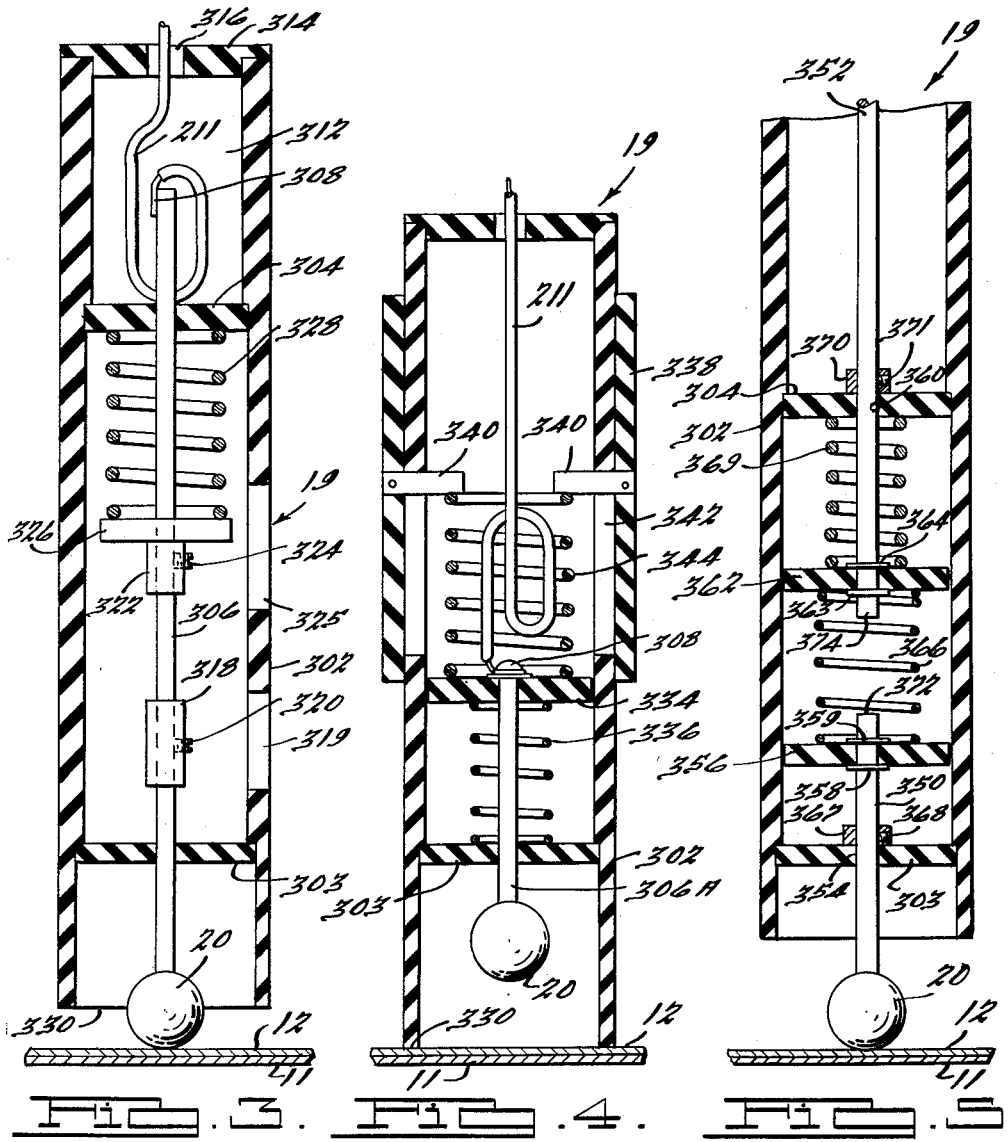
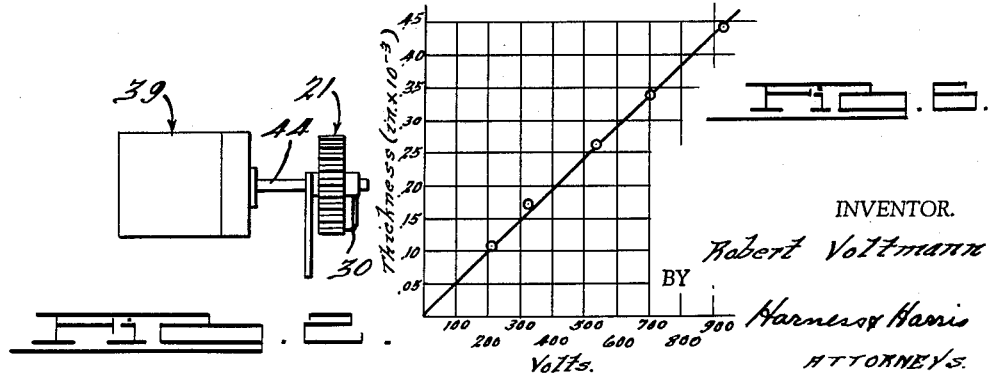

This invention relates to methods for measuring the thickness of dielectric coatings on metallic parts and to apparatus for carrying out such methods. It especially concerns methods and apparatus for measuring the thickness of anodic coatings on aluminum.

It has heretofore been the practice in anodizing plants to make coating thickness determinations by hit and miss methods. This has resulted in non-uniform operation and in substantial product rejects. The plants have not used microscopic measurement procedure which is a destructive test because it requires considerable preparation and polishing of samples and is too slow to be indicative of operating conditions. Attempts have been made to determine coating thicknesses by use of applied currents but have heretofore not been too successful because the controls were entirely manual in character and subject to variations by different operators and because of accelerated breakdown due to power surges in operation. Errors of substantial magnitude occurred making the procedures unsuitable for commercial practice.

There has therefore been a long felt need for a measuring procedure and apparatus useful for production control by shop personnel and capable when properly used of providing short time tests during plant operations. More particularly, there has been a need for a method and apparatus useful for avoiding rejects.

The present invention provides a method and apparatus for filling such a need. Although not made to possess the extreme accuracy obtainable by microscopic measurement, it is sufficiently accurate and controlling in its results so that when properly used, it provides the operator with a tool for production control and for obtaining coatings of commercially acceptable thicknesses that are within a satisfactory degree of accuracy and required coating thicknesses. The invention provides indications of coating thickness by obtaining in a predetermined manner the dielectric strength of the film in terms of the voltage required to break down the film, and relating to such voltage a film thickness corresponding to that taken from the same sample with a Filar eyepiece on a standard microscope or from a sample made with the specific type of film under consideration.

The present invention moreover avoids the problem of power surges by providing for automatic application of the applied voltage in a manner as to gradually and uniformly increase in amount from zero voltage until a peak is reached where breakdown of the coating occurs. The invention also provides means for visually ascertaining the peak voltage at breakdown and means for holding the maximum voltage reading at the point of breakdown so that errors in reading and loss of reading may be avoided. Moreover, the invention provides a probe structure for use in carrying out the novel method that assures uniformity in testing and means for cutting the probe out of the high voltage circuit when breakdown of the coating occurs.

It is therefore an object of the present invention to provide a method and means for making short time thickness determinations of dielectric coatings on metal or other current conductive parts.

A specific object is to provide a method and means for measuring the thickness of anodic coating films on aluminum.

Another object of my invention is to provide a method and means for determining the thicknesses of dielectric coatings by measuring the voltage required to break down the coating and by a procedure wherein the voltage is applied at a constant increasing rate until breakdown occurs.

Still another object is to provide a method and means of the character of the preceding object whereby the breakdown voltage is registered and visually determinable and subject to holding at the point of occurrence of breakdown at the will of the operator.

A still further object is to provide a method and means as in the preceding object wherein the mechanism for increasing the amount of applied voltage will operate to stop the further increase in voltage application when breakdown of the coating occurs.

A particular object of my invention is to provide a probe for use in carrying out the method of my invention and which assures a predetermined substantially constant pressure against the coating to be measured during the application of voltage thereto.

Another specific object is to provide means for visually registering the start, occurrence of, and completion of certain steps in the method of the invention.

Other objects and advantages of my invention will appear from the following description and from the drawings wherein:

FIGURE 1 is a schematic arrangement of the apparatus and circuiting of my invention;

FIGURE 2 schematically illustrates a modification of the motor drive of FIGURE 1;

FIGURE 3 is a sectional elevation of a probe for use in carrying out the method of my invention;

FIGURES 4 and 5 are modified forms of probes; and

FIGURE 6 shows a typical calibration curve for use with the invention.

Referring to the drawings wherein similar numerals represent corresponding parts of the structure of my invention, the numeral 10 generally represents a coated article to be tested. This may comprise a metal part 11, for example of aluminum, having a surface coating 12, for instance an anodic film, whose thickness is to be measured. The coating thickness is determined by relating the voltage necessary to break through it and establish a circuit to the thickness determined by microscopic measurement of a coating obtained under similar conditions. In order to bring a high voltage current to the coating 12, I preferably provide a spring clip type contact 13, for connection with the base 10 and in electrical circuit through a conductor 14 with one side of a variable A.C. or D.C. voltage source preferably one terminal 15 of the high voltage output secondary winding 16 of an alternating current step-up transformer 17, for instance one having a primary to secondary ratio of 1:10 and connect the other side of the voltage source for example the end 18 of the secondary winding to the coating through a manually placeable probe generally identified by the numeral 19 and illustrated in greater detail in FIGURES 3, 4, and 5, having a spring biased contact 20 adapted to apply a predetermined pressure against the coating 12 during the thickness determination procedure and which completes a circuit to the clip 13 through the metal base of the sample when breakdown occurs in the coating by reason of the applied potential.

According to my invention and in order to obtain consistent results between test specimens, the breakdown voltage from the secondary 16 of step-up transformer 17, applied to the coating through probe 19 is preferably applied as to increase uniformly and at a constant rate until breakdown occurs. This method of power application prevents sudden power surges apt to cause premature breakdown. For this purpose I provide a device generally referred to by the numeral 21 and loosely termed a "voltage divider," "powerstat," "variable transformer," or variable resistance for varying the voltage. It is preferably applied to the primary coil 22 of the step-up transformer 17 and for varying the voltage at the primary thereby similarly and proportionately varying the output voltage of the secondary in small increments preferably less than 25 volts. Although not preferred the device 21 can be employed to directly vary the output voltage of the secondary where smaller increments of output voltage are desired. The variable device 21 may for example comprise a single coil 24 preferably formed in a ring and whose opposite ends 26, 28 are connected with the positive and negative sides respectively of a power source 29, for instance, a 110-volt 60 cycle A.C. supply. Of course any other alternating current source giving a substantially true sine wave may be used.

The device 21 has a rotatable contact bar 30 journalled centrally thereof adapted to make electrical contact with succeeding turns of the coil 24. A conductor 31 connects the contact bar 30 with the end 32 of the primary coil 22 and the other end 34 of the primary coil 22 is connected to the negative side 35 of the power source 29 by conductors 36, 37 and is also connected with end 28 of the device 21 by a conductor 37a. The rotor 30 is mounted for rotation in either direction in FIGURE 1 between the ends 26, 28 to selectively divide the coil into two sections dividing the line voltage and adapted to produce a voltage at the transformer primary 22 between substantially zero and line voltage. The greater the number of turns in the section between the end 28 and rotor 30, the greater will be the voltage drop and the smaller the input voltage to coil 22. Hence the input voltage to primary 22 of transformer 17 will increase as rotor 30 is turned counterclockwise in FIGURE 1 as indicated by the arrow 38 in this figure.

The voltage output at the secondary 16 of the step-up transformer 17 will be correspondingly increased by the step-up ratio for which it is designed, a ratio of 10:1 sufficing for most applications.

The means I provide for operating the rotor 30 to obtain a uniformly increasing buildup in the voltage output of the secondary of the step-up transformer 17, comprises a constant speed motor generally referred to by the numeral 39, drivingly connected to the rotor 30 and adapted to move the latter over the surface of the coil 24 at a uniform rate. By preference the motor will be a reversible type motor facilitating operation of the rotor 30 in a counterclockwise direction during test operations and in a clockwise direction when resetting for a new test. I have illustrated in FIGURE 1 for this purpose, a 110-volt A.C. shaded pole-type reversible motor. Since the rotor contact 30 will have less than one full revolution in traversing its range of control the motor is provided with suitable reduction gearing which may be built into the motor in whole or in part. In the arrangement in FIGURE 1, the motor has a built-in speed reduction (not shown) of 450:1 providing an output or armature shaft 40 speed of 3 r.p.m. and the output shaft 40 drives the rotor contact 30 through gears 41, 42 effecting a further reduction of 1:4 or a speed of rotation of the contact rotor 30 equivalent to three-quarters of a revolution per minute. According to this arrangement, the shafts 40, 44 of the motor and contact motor respectively will parallel each other and be offset by the final reduction gearing.

In some cases it may be preferred to have a direct drive between the motor output shaft 40 and the contact rotor shaft 44, as shown for example in FIGURE 2. In that event the reduction gearing will preferably be entirely built into the motor 39 and the rotor contact 30 may be carried on the armature shaft 40.

The motor 36 shown in FIGURE 1 is a bipolar motor provided with a main field coil 46, a shading coil T on the pole 48 for controlling counterclockwise rotation of the rotor contact 30 during thickness determination operations, and a second shading coil R on the pole 49 for controlling its clockwise rotation when resetting. One end 52 of coil 46 is connected with the A.C. supply side 49 through conductors 54, 56 and a master switch 58 controlling flow of all power to the apparatus. The other end 60 of coil 46 is connected by conductors 62 and 37 with the negative side 35 of the power supply through a fuse 66. In order to provide a visual indicator that A.C. power is on I preferably provide a lamp 68 in series with a resistance 70 across the power supply on the instrument side of the switch 58 and fuse 66. When the switch 58 is closed, the lamp 68 will light up.

In operation of the motor 39, the energized field 46 will set up an induced current in the shading coils T and R and the armature 40 will rotate in the direction of the shading coil that has its circuit closed. When the latter occurs, the magnetic field is caused to shift in time phase with respect to the main magnetic field to create a torque on the armature. Thus when the circuit of coil T is closed, the armature rotates clockwise as shown by arrow 72 and counterclockwise as indicated by arrow 74 when the circuit through coil R is completed. Only one of these circuits will be closed at a given time. It will be understood that a plurality of shading coils may be provided where a turning couple is desired and that the motor may have more than two poles.

In order to control the direction of rotation of the rotor contact 30 and to prevent it from making more than one revolution in those cases where the coating being tested does not break down within the limits of the voltage output possible in one revolution thereof and again when resetting the rotor contact 30, I preferably provide limit switches generally referred to by the numerals 80, 82 respectively, in the circuits of the shading coils T and R respectively. The switch 80 comprises a stationary contact 84 and a movable contact 86 carried by an arm 88 biased by a torsion spring 90 in switch closing direction. Similarly the switch 82 comprises a stationary contact 92 and a movable contact 94 carried on an arm 96 which is biased by a torsion spring 98 in switch closing direction.

As shown in FIGURE 1, the device 21 also carries a control arm 100 rotatable with the rotor contact 30 and which is adapted to move into the path of the switch arms 88 and 96 during the last part of the rotation of the rotor contact 30 in its counterclockwise and clockwise directions of movement respectively, to open switches 80 and 82 respectively. The arm 100 will preferably be positioned relative to the rotor contact 30 and switch arm 88 such that the switch 80 is opened by arm 100 when the rotor contact 30 has reached the point on coil 24 adjacent end 26 where maximum voltage will be impressed upon the primary coil 22 of the step-up transformer 17. Moreover, this relationship between the arm 100 and rotor contact 30 will preferably be such that when the rotor contact 30 is rotatably returned to its starting point adjacent coil end 28 corresponding to minimum voltage input for the primary coil 22 for the purpose of resetting the mechanism for another test cycle the switch arm 96 will effect opening of switch 82. It will be understood that the switches 80 and 82 may be opened at a different position of contact arm 30 from that stated. Moreover, although arms 30 and 100 are shown angularly offset, they may be in any other angular position than that shown.

When the switch 80 is open, the circuit through shading coil T will be open. Similarly, when switch 82 is open the circuit through shading coil R will be open. Each of these switches is in series with other control switches to be described, such that when both shading coil circuits are open, the motor 39 will cease rotation. Normally switch 80 will be constantly closed and will be opened only when no breakdown occurs in a coating and the rotor contact continues its movement to its position of maximum voltage adjacent coil end 26. On the other hand, switch 82 will be opened each time the rotor contact 30 is reset to its starting position adjacent coil end 28 (shown in phantom) for another test operation. In intermediate positions of rotor contact 30, both of switches 80 and 82 will be closed and whenever one is open the other will be closed.

The means I provide for visually registering the voltage being applied to the coating 12 of the sample 10, comprises a volt meter 110 whose terminals 112, 114 are connected across the end terminals 15, 18 of the secondary coil 16 of the step-up transformer 17 by suitable circuiting 14, 115. A resistance 116 is placed in series with the volt meter between terminals 114 and 15 to enable an increase in the range of readings possible by the volt meter and to protect the volt meter from high current surges when breakdown occurs at the coating. A second resistance 118 of about 800 ohms is preferably placed in series with the volt meter between terminals 112 and 18 to provide a current load.

A feature of my invention is to stop the rotor contact 30 controlling the step-up transformer output at the point in its counterclockwise rotation where breakdown of the coating occurs and to hold i.e., continue to show the voltage output reading on the volt meter of the step-up transformer at this point. For this purpose I provide, among other things for operation in conjunction with the motor 36 shading coils T and R, probe 19 and rotor contact 30, a test and reset double throw switch generally designated by the numeral 130, A.C. and D.C. relays generally referred to by the numerals 132, 134 respectively and a further limit switch 136.

The switch 130 has one of its movable contact members 138 connected with the A.C. power supply through conductor 56 and master switch 58 and has its second movable contact member 139 connected by a conductor 140 to one end 142 of shading coil R and to one end 144 of shading coil T. The other end 146 of coil R connects with limit switch 82 stationary contact 92 and the opposite end 148 of coil T connects with the movable contact 86 of limit switch 80. The D.C. relay 134 has an electromagnet operating coil 150 and a normally open switch O comprising a stationary contact 154 and a movable contact 156 on an arm 158 biased by a spring 160 to open circuit position. The coil 150 has one end connected by conductors 162 and 115 with terminal 18 of the transformer secondary and has its other end connected to a D.C. rectifier 164 by a conductor 166, the rectifier connecting by series-connected conductors 168, 170 with movable contact 172 of a normally closed switch B of A.C. relay 132. The A.C. relay has an electromagnet operating coil 173, normally closed switches A and B and a normally open switch C. The switches A and B comprise stationary contacts 174, 175 and movable contacts 176, 172 carried by an arm 180 biased to switch closing position by a spring 182. The normally open switch C comprises a stationary contact 184 and a movable contact 186 on the arm 180.

One end 190 of electromagnet coil 173 is connected by a conductor 192 with the stationary contact 194 of switch 130 which when closed connects the coil 173 through the conductor 192, switch blade 138, conductor 56 and master switch 58 to the positive side 49 of the A.C. power supply 29. The other end 196 connects by a conductor 198 with the movable contact 156 of switch O of the D.C. relay 134. It also connects by a conductor 199 with the stationary contact 184 of switch C; the movable contact 186 of the latter connecting by conductors 200 and 37 with the negative side 35 of the power supply 29.

Switch A has its stationary contact 174 connect by a conductor 202 with stationary contact 84 of limit switch 80 and has its movable contact 176 connect by a conductor 204 with the stationary contact 206 of switch 130 which when closed connects the relay switch A through conductor 204, switch blade 139 and conductor 140 with the ends 142, 144 respectively of the motor shading coils R and T.

Switch B has its stationary contact 175 connect by conductor 210 with the flexible lead 211 of the probe 19 and with its contact 20. The movable contact 172 of relay switch B connects with the D.C. rectifier 164 by conductors 170, 168.

As additional features to facilitate the most effective application of my invention, I may provide an electric lamp 220, for instance, a neon lamp, or one that is of a different color from that of the lamp 68 for the main current supply, that will be controlled to be illuminated to indicate that the rotor contact 30 has been reset to its low voltage starting position and that the apparatus is in condition for throwing the switch 130 to test position, and making a new test; also, an electric lamp 222 of still another color or distinction from the lamps 68 and 220 adapted to become illuminated when the coating whose thickness is being measured breaks down under the applied voltage build-up thereby indicating to the operator that breakdown has occurred and that a reading of the volt meter should be made.

As shown in FIGURE 1, the lamp 220 is preferably connected across the power supply 29 under control of the master switch 58 and the previously referred to limit switch 136, the latter controlled by the arm 96 of the reset limit switch 82 and arm 100 of the device 21. The switch 136 comprises a stationary contact 224 connected by a conductor 226 with the negative side 35 of the supply source 29 through the conductor 37 and includes a movable contact 228 carried by the arm 96 which connects with one side of the lamp 220 through a conductor 230 and a resistance 232, the other side of the lamp connecting with the power supply through a conductor 234, the conductor 56 and the master switch 58. It will be evident that when the rotor contact 30 is in the position shown in full in FIGURE 1 and the limit switch control arm 100 is in its related position, both corresponding to a position wherein the maximum voltage has been reached without breaking down the coating being tested, thus opening the switch 80 and stopping the motor 36, that the switch 136 will at this time be open, the switch 82 closed, and the lamp 220 will be out. However, when the manual switch 130 is thrown to its reset position with its movable arm 139 in contact with contact 235, to obtain a reversal of rotation of the motor 36, the contact 30 and arm 100 will rotate in a clockwise direction in FIGURE 1 until the arm 100 reaches the position shown in phantom at which time it will actuate the arm 96 to open the switch 82 thus stopping the motor 36 and closing the switch 136 completing the circuit through the lamp 220 and effecting its illumination to indicate that the contact rotor 30 is now in position to start a new thickness test.

The indicating lamp 222 has one side that connects with contact 194 of test switch 130 through conductors 240, 242, and 192, the conductor 242 also connecting with coil end 26 of the device 21. The other side of this lamp connects through a resistance 241 and conductor 244 with the stationary contact 184 of the switch C of the A.C. relay 132. In operation of the lamp 222, so long as the relay 132 coil 173 is de-energized such that the switch C is open, there will be no current flowing through the lamp 222. However, when breakdown occurs in the coating such that a current may flow between the probe contact 20 and contact clip 13 through the lead 211, conductor 210, switch B, and conductor 170, such will also cause energization of the D.C. relay coil 150 and closing of switch O to energize the A.C. relay coil 190 and effect a closing of the switch C, thereby bringing the negative side 49 of the power supply 29 to the lamp 222 by conductors 37, 200, 244 to effect a current flow, the return from the other side of the lamp to the positive side of the A.C. supply being provided through the conductors 240, 242 and 192, switch 138, conductor 56, and master switch 58. It is assumed, of course, that the switch 130 is closed at this time so as to call for a test.

In operation of the structure of my invention as thus far described, it will be evident that the operator in using the instrument will first close the master switch 58 to apply A.C. power to the device; that such power is on will be indicated by the lamp 68 which will then become illuminated. If at this time the reset lamp 220 also lights up, the operator will know that the instrument is in condition for effecting a thickness test. If the lamp 222 does not light up, it shows that the device was not reset after the last test. To reset the device, the switch 130 will then be thrown to the reset switching position, thus establishing a circuit through the limit switch 82 which is then closed and through the shading coil R of the motor 36 to cause clockwise rotation of the rotor contact 30 and arm 100 to its minimum voltage position of the device 21 adjacent the coil end 28. Such clockwise rotation will occur whether the rotor contact 30 was stopped at a partway position as the result of breakdown of the coating of a previous test, at which time both switches 80 and 82 would be closed but the switch 80 rendered ineffective because the switch 130 is not on the test side or if the situation is one where the arm 100 had traversed the complete revolution without effecting breakdown and the switch 80 was open. Establishment of the aforesaid circuit will cause clockwise rotation of the rotor contact 30 and trip arm 100 which will continue until the arm 100 engages the limit switch arm 96 and opens the switch 82 to stop the motor 36, rotor contact 30 and arm 100 from further rotation. At this time the limit switch 80 if previously open will have become closed and at which time switch 136 will be closed by the described operation of the limit switch arm 96 to establish a circuit through the reset lamp 220 and it will become lighted.

The operator now knows that the instrument is set for a thickness test and he will attach the clip 13 to the metal portion of a sample and apply the probe 19 contact 20 against the coating with appropriate pressure determined in a manner hereinafter described. Either prior to this or at this time, the switch 130 will be thrown to the test position and a circuit will be established through the shading coil T by way of the relay switch A and the limit switch 80 (now closed). The motor will now rotate in a direction to cause the rotor contact 30 to move counterclockwise and will build up the applied voltage at the probe in the manner and at the rate previously described until breakdown occurs at which time a circuit will be completed through the relay switch B causing energization of D.C. relay coil 150 and closing of the switch O. Closing of the latter establishes a circuit energizing A.C. relay coil 173 closing switch C of the A.C. relay and opening of switch B. Opening of switch B opens the probe circuit taking the current off the probe and sample. Closing of switch C causes lamp 22 to light up to show that the test has been completed. It will be noted that although the current is now removed from the probe circuit, the volt meter 110 continues to register the voltage at breakdown as current still flows through the primary coil 22 of the step-up transformer 17 at a voltage determined by the position at which the rotor contact 30 was stopped when breakdown of the coating took place.

On some occasions it may be desired to set one value as a standard and to make a quick rough check on a plurality of samples without going through complete cycles for each sample. Although such procedure is not recommended, because a coating which will stand up when subjected to the regular test pattern of a gradually increasing voltage may not stand up for a single spot reading because of the sudden power application, it can nevertheless be carried out by including in the circuit of the main coil 46 of the motor 39 a normally closed manually operable switch 250 which with the switch 130 in test position may be opened at any predetermined reading of the voltmeter 110 to stop the motor 39 at the position of the rotor contact 30 for that reading. Thereafter any number of checks may be made at the selected voltage without going through the entire test cycle. When return to normal operation is desired, the switch 250 is again closed.

It will be understood that while voltage readings may be taken from the volt meter 110, the scale of this instrument may be graduated to give direct thickness readings and may have a plurality of scales to indicate the thickness of the coating corresponding to the voltage at breakdown for such a coating made in accordance with a process using a particular anodizing solution. In the event that the reading taken from the volt meter is in volts, reference can be made to a standard graph plotting coating thickness for the anodizing solution in question against voltage readings and the thickness determined in this manner. By taking the average of a reasonable number of readings between four and twelve a substantially accurate thickness determination may be obtained. The instrument has definite value as a production control device because of its ability to give the answer to coating thickness by tests that may be carried out in a short time without fuss or difficulty and without need of a laboratory technician. It is especially useful in anodizing plant operations where a series of products (each constituting an anode) to be treated are arranged at different distances from the cathode of the electrolytic circuit and whereby some variation in the extent of anodizing at the different products will occur. The instrument can be used to check the anodized film on the product obtaining the lowest anodizing charge to be sure that the film it produces will be of sufficient thickness. Moreover, the instrument is capable of making a plurality of quick thickness checks at different points or areas of the same coating.

In FIGURE 6 I have shown a typical calibration curve for checking coating thickness for 15% $H_2SO_4$ aqueous solution for producing anodic coatings by electrolytic processes. In the graph, coating thicknesses are plotted against breakdown voltage readings. The thicknesses given are those obtained by microscopic measurements at the voltages where breakdown occurred. It will be noted when a series of points were plotted employing the present invention and using a ¼" diameter contact ball and a loading of 155 grams, the graph obtained is a straight line so that for the solution employed the coating thickness is directly proportional to the voltage at breakdown.

A feature of my invention is the probe structure I employ to apply the coating contact member 20 during testing. Referring to FIGURE 3, I have there shown a probe structure 19 comprising a casing or shell 302 of suitable electrical insulation material, for example a molded plastic, having a pair of spaced internal walls 303, 304 which may be of similar material and between which is supported for axial movement a metallic probe member 306 having a metal ball tip or contact 20 secured to its lower end in any suitable manner. The upper end of the probe rod 306 has attached as at 308 a suitable flexible conductor 211 lead which, as shown in FIGURE 1, connects with the conductor 210 of the instrument. The lead 211 is of sufficient length and generally looped in the space 312 between the internal wall 304 and an end cap 314 to accommodate axial movement of the probe rod element 306. The end wall 314 has an opening 316 through which the flexible lead 211 may extend. The rod 306 is provided with a sleeve 318 adjustable thereon through an opening 319 and secured thereto by a set screw 320. The sleeve 318 may be positioned relative to the contact 20 to serve as a stop for limiting outward projection of the contact 20 from the casing 302 to a predetermined amount, the wall 303 serving as an abutment for the stop sleeve 320.

The probe rod 306 is also provided with a sliding collar or hub 322 adjustable thereon and clamped for instance by a set screw 324 through an opening 325. This collar 322 has a flange portion 326 which serves to locate between it and the wall 304, resilient means 328, for example a suitable compression coil spring adapted to apply an axial bias against this flange to urge the contact 20 to its outward and limiting position. The collar 322 will preferably be located on the element rod to provide a predetermined pressure of the spring 328 against the contact 20 and in turn against the coating 12 of the specimen whose coating thickness is to be determined, when the lower end 330 of the shell 302 abuts the coating 12 which is the position of maximum pressure. With the described construction, it is possible to provide a predetermined pressure of the contact against the coating 12 that is the same for each test that is made. Moreover, the shell becomes an indicator telling the operator when the testing operation may start.

FIGURE 4 shows a modification of the structure in FIGURE 3 wherein the contact member 20 of the probe element 306A is never exposed beyond the end 330 of the shell 302 so as to protect the operator from any current shock at any time prior to, during and after a thickness test. In this construction the probe rod 306A is guided in a bearing opening in the wall 303 and by a sliding washer 334 of metal or other material secured to the rod 306A to be movable with it, and slidable on the inner surface of the shell 302. Resilient means in the form of a spring 336 is positioned between the wall 303 and the washer 334 and tends to raise the contact 20 in an upward direction. Surrounding the shell 302 is a slidable sleeve 338 preferably of insulation material carrying a plurality, preferably two or more, of inwardly projecting pins 340 by which it is guided for coaxial movement in longitudinal slots 342 in the shell 302. A second resilient means in the form of a compression spring 344 of greater strength than the spring 336 operates between the upper side of the sliding collar 334 and the pins 340 and in its free condition shown in FIGURE 4, acts as a power transmitting member between the washer 334 and the pins 340 thus permitting the sleeve 338 to be urged by the spring 336 to its uppermost position shown determined by the slots 342. The flexible lead 211 is connected to the upper end of probe rod 306A as at 308. It will be understood that the spring 336 need only be strong enough to maintain the sleeve 338 in its upper position.

In operation of this probe structure, the shell 302 is positioned over the coating and the sleeve 338 pushed downwardly loading the spring 344 and exerting a downward bias against the sliding washer 334 of the probe element and the spring 336. By making the spring 344 stronger than the spring 336, it will be evident that the spring 336 will compress to the point where the ball 20 touches the coating after which the entire excess pressure will be transmitted to the coating face through the washer 334. The pressure upon the ball contact 20 after it encounters the coating 12 will be represented by the difference in the forces exerted by the springs 336 and 344. The amount of movement of the contact 20 before it touches the coating 12 will preferably be less than the compressed height of the spring 336 and the length of slots 342, the latter determining the maximum pressure that may be exerted by the spring 344 upon the contact 20. It will be evident that with this arrangement the ball contact 20 is at no time exposed beyond the shell 302 for contact with the operator or parts of the apparatus. Moreover, as in the FIGURE 3 construction, a predetermined pressure may be obtained on the contact 20 that is the same during all tests.

In each of the constructions in FIGURES 3 and 4, there is a continuous electrical connection between the ball contact 20 and the lead 211 so that if the switch 130 of the instrument is in test position and the ball is brought into contact with the coated metal surface of the specimen and breakdown occurs in the coating 12, a current flow will immediately occur. The same will be true if the ball is brought into contact with the metal surface. Where it is expedient to avoid the latter possibility, it may be desired to provide a probe of the general form shown in FIGURE 3 wherein in normal operation the contact ball 20 normally projects outwardly of the shell 302, yet wherein a circuit is not established and actual current flow cannot take place between the contact 20 and the lead 211 until an internal switch is closed. Such a construction is illustrated in FIGURE 5 where the probe rod is made of two coaxial parts; a lower section 350 carrying the ball contact 20 and an upper section 352 having the lead 211 (not shown) connected to its upper end.

The lower section 350 is journalled for axial movement at 354 in the lower internal fixed wall 303 of the shell 302 and guided in the shell by a piston-like washer 356 fixed to rod 350 by spring collars 358 and 359 and slidable in the shell 302. The upper section 352 is journalled as at 360 in the upper internal fixed wall 304 of the shell 302 and it too is guided in the shell by a piston-like washer 362 fixed to rod 352 by spring collars 363, 364. A light compression spring 366 operates between the pistons 356, 362 urging the piston downwardly to a limit determined by an adjustable stop collar 367 fixed by a set screw 368. It also urges the piston 362 upwardly to a limit determined by a stronger compression spring 369 which in its free or compressed condition shown in FIGURE 5 serves as a stop for the piston 362. An adjustable collar 370 held by a set screw 371 is located on the rod section 352 to limit the lower position to which the piston 362 may be moved.

In operation of this probe when the ball 20 is brought to bear on the coating 12 and the shell 302 is pushed downwardly, it causes the spring 366 to compress and build up light pressure on the contact 20. When the shell 302 has substantially reached the coating, the ends 372 and 374 of the lower and upper probe elements 350 and 352 respectively will come into contact with each other thus providing a continuous electrical circuit between these probe sections. Upon further movement of the shell 302 downwardly, the spring 369 will be compressed and will thereby determine the pressure upon the contact 20. This pressure may be adjusted by adjusting the position of the collar 370 and spacing between the probe sections. It will be understood that since the probe sections are usually brought into contact with each other before breakdown occurs in the coating, there is little trouble to be expected from arcing across these members in making contact with each other.

From the foregoing description of my invention, it will be evident that I have provided a novel method and structure for determining the thickness of anodic coatings and the like that is well adapted for such work and a useful tool for operators in coating plants where substantially quick and substantially accurate thickness readings are desired to be taken. It will be understood that various changes and modifications in the specific form and structure illustrated may be made by those skilled in the art without departing from the spirit and intent of my invention. For instance and as previously noted, the potential control may be applied to the high voltage side of the step-up transformer. Moreover, the device can be used with a D.C. supply and a change to A.C. prior to step-up be obtained by an electronic vibrator. Furthermore by the use of a rectifier, the A.C. output of the transformer may be changed to D.C. All such and other changes and modifications as may come within the scope of the appended claims are therefore included.

I claim:

1. A method of determining the thickness of anodic and other coating films comprising applying an electric current potential to said film over a range that starts with a first potential of predetermined value and ends with a second potential at breakdown of said film, gradually and automatically building up said potential in said range at a substantially uniform rate, and maintaining said breakdown potential on an indicating circuit after breakdown.

2. A method of determining the thickness of anodic and other coating films comprising continuously applying an electrc current potential to said film starting at a first potential of predetermined value and gradually building up the amount of the same at a substantially uniform rate, stopping the buildup of potential when breakdown of the film occurs and continuing the application of said breakdown potential on a potential measuring circuit after breakdown.

3. A method of determining the thickness of anodic and other coating films comprising continuously applying an alternating current potential to said film starting at a potential of predetermined value, gradually building up said potential and at a substantially uniform rate, automatically stopping the buildup of potential when breakdown of the film occurs, registering said breakdown potential on a potential responsive instrument and maintaining said break down potential on said instrument after breakdown has occurred.

4. A method of determining the thickness of anodic and other coating films comprising applying an electric current potential to said film starting with a potential of predetermined value, gradually increasing said current potential and at a substantially uniform rate, stopping the application of said electric current to said film when breakdown thereof occurs, and continuing the application of said current at a secondary location after breakdown adapted to register the amount of said breakdown potential.

5. A method of determining the thickness of anodic and other coating films comprising applying an alternating electric current potential to said film starting with a substantially zero potential, increasing the amount of said potential at regular intervals, stopping the application of said electric current through said film when breakdown thereof occurs, continuing the application of said electric current after breakdown of said film at a secondary location adapted to measure said breakdown potential and directly reading at said secondary location the film thickness corresponding to said breakdown potential.

6. A device for determining the thickness of anodic and other coating films comprising electrode means for applying an electric current potential from a source to said films, means for multiplying the current potential from said source to said electrode means, a first potential control means operable from a starting position through a range of potential for controlling the current potential supplied to said electrode means, a second potential control means for so controlling said first potential control means as to effect supply of said current potential to said electrode means in amount that increases by predetermined increments and control means operable upon said second potential control means for effecting direct return of said first potential control means to its said starting position from any point in said range.

7. A device for determining the thickness of anodic and other coating films comprising circuit means including electrode means for applying an alternating current potential from a source thereof to said films, potential multiplying means for multiplying the alternating current potential from said source to said electrode means including an input connected with said current source and an output for connection with said electrode means, means for variably controlling the current potential to said input of said potential multiplying means, means for controlling said potential controlling means for obtaining a continuous current potential change increasing by substantially predetermined amounts until film breakdown occurs and means in said circuit means energized at film breakdown under control of said electrode means for interrupting further potential change by said last named controlling means and for open circuiting said circuit means including said electrode means without open circuiting said potential multiplying input and output.

8. A device for determining the thickness of anodic and other coating film comprising electrode means for applying an electric current potential from a source thereof to said films, current potential control means for supplying said current potential to said electrode means until film breakdown occurs, the said potential increasing by predetermined amounts, means for registering the breakdown potential and means for maintaining said breakdown potential on said registering means after breakdown of said film.

9. A device for determining the thickness of anodic and other coating films and operable from an alternating current source comprising electrode means for applying an alternating current potential from said source to said films, a step-up transformer having an input and an output, circuit means connecting said electrodes with said transformer output, a potential divider in circuit connection with said transformer and operable from a starting position through a predetermined range of operation, means for operating said potential divider over said range such that the potential delivered by said transformer to said electrode means is continuously raised by substantially predetermined amounts and control means operable for effecting operation of said operating means for said potential divider to return said potential divider directly to said starting position from any position in said range.

10. A device for determining the thickness of anodic and other coating films and operable from an alternating current source comprising electrode means for applying an electric current potential from said source to said films, a step-up transformer having an input and output, circuit means connecting said electrode means with said transformer output, a potential divider in circuit connection with said source and with said transformer input, means for operating said potential divider over a range of potential such that the potential on said input is continuously raised by predetermined increments from a predetermined minimum value to a predetermined maximum value, and means including a limit switch and a reset switch operable for controlling return of said divider to its condition of minimum value directly from any point in said operating range of said potential divider.

11. A device for determining the thickness of anodic and other coating films and operable from an alternating current source comprising electrode means for applying electric current potential from said source to one of said films, a step-up transformer having an input and an output, circuit means connecting said electrodes with said transformer output, a rotary potential divider comprising a coil and a rotary contact operating over said coil in a manner to electrically divide said coil into two sections, circuit means connecting said rotary contact with said transformer input, circuit means connecting the ends of said coil with the power source and connecting one end with said transformer input, a substantially constant speed motor for rotating said rotary contact means operable for stopping operation of said motor and thereby rotation of said contact upon establishment of a circuit from said source through said film, and means operable for restarting said motor and effecting a reversal of direction of rotation of said rotary contact from its point of stoppage.

12. A device for determining the thickness of anodic and other coating films and operable from an alternating current source comprising electrode means for applying an alternating current potential from said source to one of said films, a step-up transformer having an input and an output, circuit means connecting said electrodes with said transformer output, a rotary potential divider comprising a coil and a rotary contact operating over said coil in a manner to electrically divide said coil into two sections, circuit means connecting said rotary contact with said transformer input, circuit means connecting the ends of said coil with the power source and connecting one end with said transformer input, a constant speed motor for rotating said rotary contact, switch means for controlling said motor whereby to limit rotation of said rotary contact to less than one full turn, instrument means for receiving and registering a value corresponding to the potential across said transformer output, means including a relay operable upon said motor for stopping rotation of said rotary contact and circuit means for maintaining the said potential at said instrument means during operation of said contact and after stoppage of rotation thereof.

13. A device for determining the thickness of anodic and other coating films and operable from an alternating current source comprising electrode means for applying an alternating current potential to said films, step-up transformer means for stepping up the current potential from said source delivered to said transformer, circuit means connecting said electrode means with the output of said transformer, potential divider means for controlling the current potential delivered by said transformer, operating means for selectively operating said divider means between a first position effecting a predetermined minimum current potential delivery by said transformer and a second position effecting a maximum current potential delivery by said transformer, power means for operating said operating means whereby said divider means is caused to effect a gradual change in the current potential delivered by said transformer until breakdown of said film occurs, means including a direct current relay, an alternating current relay, and switch means in association with said relays, for controlling substantial immediate freezing of the current potential delivered to said electrode means at breakdown of said film.

14. A device for determining the thickness of anodic and other coating films and operable from an electric current source comprising electrode means for applying an electric current potential to said films, step-up transformer means for stepping up the current potential from said source delivered to said transformer, potential divider means for controlling the current potential delivered by said transformer means, circuit means connecting said electrode means with the output of said transformer means, operating means for selectively operating said divider means between a first position effecting a predetermined minimum current potential delivery by said transformer means and a second position effecting a maximum current potential delivery by said transformer means, motor means for operating said operating means whereby said divider means is caused to effect a gradual change in the current potential delivered by said transformer means, limit switch means operable by said operating means for controlling operation of said motor means whereby the latter is stopped when said operating means has established said minimum or maximum potential conditions, further means for effecting stopping of said motor means when breakdown of said film occurs at a potential intermediate said minimum or maximum potential positions of said divider means and electrical control means operable upon said motor means for directly returning said divider means to said position of minimum potential from its position at breakdown potential.

15. A device for determining the thickness of anodic and other coating films and operable from an alternating current source comprising electrode means for applying an alternating current potential from said source to a film, step-up transformer means for stepping up the current potential from said source delivered to said transformer means, potential divider means for controlling the current potential delivered by said transformer means, operating means for selectively operating said divider means between a first position effecting a predetermined minimum current potential delivery by said transformer means and a second position corresponding to the current potential delivery by said transformer means effecting breakdown of the film, motor means for operating said operating means whereby said divider means is caused to effect a gradual change in the current potential delivered by said transformer means, control means for stopping said motor means at breakdown of said film, means for receiving the current potential on said film at breakdown thereof and registering the thickness of said film corresponding to said breakdown potential and means facilitating the maintenance of said breakdown potential at said registering means after film breakdown has occurred.

16. A device for determining the thickness of anodic and other coating films and operable from an alternating current source comprising electrode means for applying an alternating current potential to a film, step-up transformer means for stepping up the current potential from said source delivered to said transformer means, potential divider means for controlling the current potential delivered by said transformer means, circuit means connecting said electrode means with the output of said transformer means, operating means for selectively operating said divider means between a first position effecting a predetermined minimum current potential delivery by said transformer means and a second position effecting a predetermined maximum current potential delivery by said transformer means, motor means for operating said operating means whereby said divider means is caused to effect a gradual change in the current potential delivered by said transformer means, limit switch means operable by said operating means for controlling operation of said motor means whereby the latter is stopped when said operating means has established said minimum or maximum potential conditions, electromagnetic means for controlling said motor means as to stop a further increase in current potential at breakdown of said film, means for visually indicating said breakdown potential and means facilitating the continued application of said breakdown potential at said indicating means after breakdown has occurred.

17. A device for determining the thickness of anodic and other coating films and operable from an alternating current source comprising electrode means for applying an alternating current potential from said source, to a film, step-up transformer means for stepping up the current potential from said source delivered to said transformer, potential divider means for controlling the current potential delivered by said transformer means, operating means for selectively operating said divider means between a first position effecting a predetermined minimum current potential delivery by said transformer and a second position effecting a predetermined maximum current potential delivery by said transformer, motor means for operating said operating means whereby said divider means is caused to effect a gradual change in the current potential delivery by said transformer means, limit switch means operable by said operating means for controlling operation of said motor means whereby the latter is stopped when said operating means has established said minimum or maximum potential conditions, a first electromagnetically operable switch means operable for effecting opening of the circuit through said film at breakdown thereof, and a second electromagnetically operable switch means for controlling operation of said motor means whereby said motor means is stopped at film breakdown.

18. A device for determining the thickness of anodic and other coating films and operable from an alternating current source comprising electrode means for applying an alternating current potential from said source to a film, step-up transformer means for stepping up the current potential from said source delivered to said transformer means, potential divider means for controlling the current potential delivered by said transformer means, operating means for selectively operating said divider means between a first position effecting a predetermined minimum current potential delivery by said transformer means and a second position effecting a predetermined maximum current potential delivery by said transformer means, motor means for operating said operating means whereby said divider means is caused to effect a gradual change in the current potential delivered by said transformer means, limit switch means operable by said operating means for controlling operation of said motor means whereby the latter is stopped when said operating means has established said minimum or maximum potential conditions, a first electromagnetically operable switch means operable to effect opening of the circuit through said film at breakdown thereof, a second electromagnetically operable switch means for controlling operation of said motor means whereby said motor means is stopped at film breakdown, and means for visually indicating that film breakdown has occurred.

19. A device for determining the thickness of anodic and other coating films and operable from an alternating current source comprising electrode means for applying an alternating current potential from said source to a film, step-up transformer means for stepping up the current potential from said source delivered to said transformer means, potential divider means for controlling the current potential delivered by said transformer means, operating means for selectively operating said divider means between a first position effecting a predetermined minimum current potential delivery by said transformer means and a second position effecting a predetermined maximum current potential delivery by said transformer means, power operable means for operating said operating means whereby said divider means is caused to effect a gradual change in the current potential delivered by said transformer means, limit switch means operable by said operating means for controlling operation of said motor means whereby the latter is stopped when said operating means has established said minimum or maximum potential conditions, a first electromagnetically operable switch means operable for effecting opening of the circuit through said film after breakdown thereof, a second electromagnetically operable switch means for controlling operation of said motor means whereby said motor means is stopped at film breakdown, and means for visually registering the breakdown potential and holding the same.

20. A device for determining the thickness of anodic and other coating films and operable from an alternating current source comprising electrode means for applying an alternating current potential from said source to a film, step-up transformer means for stepping up the current potential from said source delivered to said transformer means, potential divider means for controlling the current potential delivered by said transformer means, operating means for selectively operating said divider means between a first position effecting a predetermined minimum current potential delivery by said transformer means and a second position effecting a predetermined maximum current potential delivery by said transformer means, motor means for operating said operating means whereby said divider means is caused to effect a gradual change in the current potential delivered by said transformer means, manually operable switch means for controlling operation of said motor means between positions corresponding to said first and second positions of said divider and vice versa, limit switch means for stopping said motor means at positions corresponding to said first and second positions of said potential divider, control means for stopping said motor means at breakdown of said film, means for registering a value corresponding to film thickness at breakdown thereof, control means for opening the circuit through said electrode means and film upon breakdown of the latter, means for visually indicating breakdown of the film, means for visually indicating when said potential divider means is in said first position, and means for operating said last-named indicating means.

References Cited in the file of this patent

UNITED STATES PATENTS

| | | |
|---|---|---|
| 2,267,606 | Goldstine | Dec. 23, 1941 |
| 2,310,335 | Wolfson | Feb. 9, 1943 |
| 2,396,172 | Groven et al. | Mar. 5, 1946 |
| 2,712,112 | Weeks | June 28, 1955 |
| 2,724,087 | Hand | Nov. 15, 1955 |
| 2,750,562 | Starr | June 12, 1956 |
| 2,790,051 | Sicho | Apr. 23, 1957 |
| 2,790,144 | Sicho | Apr. 23, 1957 |
| 2,836,792 | Weber | May 27, 1958 |